(12) United States Patent
Mark et al.

(10) Patent No.: US 7,383,392 B2
(45) Date of Patent: Jun. 3, 2008

(54) PERFORMING READ-AHEAD OPERATION FOR A DIRECT INPUT/OUTPUT REQUEST

(75) Inventors: Timothy W. Mark, Goffstown, NH (US); D. John Shakshober, Townsend, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 282 days.

(21) Appl. No.: 11/141,340

(22) Filed: May 31, 2005

(65) Prior Publication Data

US 2006/0271740 A1    Nov. 30, 2006

(51) Int. Cl.
G06F 13/00 (2006.01)
G06F 12/00 (2006.01)

(52) U.S. Cl. .................. 711/137; 711/100; 711/154

(58) Field of Classification Search ............... 711/100, 711/137, 154, 200
See application file for complete search history.

(56) References Cited

U.S. PATENT DOCUMENTS

| | | | |
|---|---|---|---|
| 5,136,692 A * | 8/1992 | Barrett et al. .............. 710/5 |
| 5,740,370 A * | 4/1998 | Battersby et al. .......... 709/219 |
| 6,321,293 B1 | 11/2001 | Fabrizio et al. |
| 6,370,614 B1 * | 4/2002 | Teoman et al. ............. 711/113 |
| 6,442,682 B1 * | 8/2002 | Pothapragada et al. ...... 713/1 |
| 6,687,765 B2 * | 2/2004 | Surugucchi et al. ......... 710/15 |
| 6,728,840 B1 | 4/2004 | Shatil et al. |
| 6,732,237 B1 | 5/2004 | Jacobs et al. |
| 7,000,077 B2 * | 2/2006 | Grimsrud et al. .......... 711/137 |
| 2002/0188801 A1 | 12/2002 | Green |
| 2003/0115410 A1 * | 6/2003 | Shriver ..................... 711/113 |
| 2005/0080996 A1 | 4/2005 | Loafman |
| 2006/0090031 A1 * | 4/2006 | Kirshenbaum et al. ..... 711/113 |

OTHER PUBLICATIONS

"HP JFS 3.3 and HP OnLineJFS 3.3 Veritas File System 3.3 System Administrator's Guide for HP-UX 11.00 and HP-UX 11i". Hewlett Packard. Nov. 2000. pp. 108, 111-113, and 157.*
Kozierok, Charles. "Operating Systems and Controller Disk Caching". Reference Guide —Hard Disk Drives. PC Guide. Apr. 2004. pp. 1-2. http://web.archive.org/web/20040422164632/http://storagereview.com/guide2000/ref/hdd/perf/perf/ext/pcCaching.html.*
Brian Wong, "Design, Features, and Applicability of Solaris File Systems," pp. 1-27 (Jan. 2004).

* cited by examiner

Primary Examiner—Tuan V. Thai

(57) ABSTRACT

A system includes a storage subsystem, a storage controller, and a cache associated with the storage controller. A file system logic receives a direct I/O request for a first data portion stored in the storage subsystem. The file system logic performs a read-ahead operation in response to the direct I/O request to request at least one other data portion stored in the storage subsystem. The cache associated with the storage controller stores the at least one other data portion requested by the read-ahead operation.

19 Claims, 2 Drawing Sheets

PERFORMING READ-AHEAD OPERATION FOR A DIRECT INPUT/OUTPUT REQUEST

BACKGROUND

Typically, data stored in a storage subsystem is accessed by a file system, which is usually associated with an operating system such as Unix, DOS, Microsoft WINDOWS®, Mac OS, and so forth. Software, such as application software, in a computer can access data stored in the storage subsystem through the file system. There are generally two types of requests that can be issued by application software or other software for data stored in the storage subsystem: cached input/output (I/O) requests and direct I/O requests. In response to a cached I/O request, the file system performs a speculative read-ahead operation to retrieve read-ahead data (in addition to the data requested by the cached I/O request). The read-ahead data is stored in an operating system buffer cache maintained by the operating system.

The speculative read-ahead operation is generally performed to pre-populate the operating system buffer cache with data. If a subsequent request from the application software can be satisfied from the operating system buffer cache, then system performance is enhanced since the data can be retrieved more quickly from the operating system buffer cache than from the storage subsystem, which is usually implemented with relatively slow mass storage devices such as disk drives and the like.

In contrast, for a direct I/O request, a conventional file system does not cache data in the operating system buffer cache. For direct I/O requests, read-ahead is not performed to pre-populate the operating system buffer cache. Direct I/O requests are used by certain types of applications to avoid the expense associated with buffering data in the operating system buffer cache.

Generally, software applications have to choose between using either direct I/O or cached I/O requests. If direct I/O is chosen, speculative read-ahead is not performed so that any subsequent requests for data will result in access of the slower storage devices in the storage subsystem, since read ahead was not performed for caching read-ahead data.

DETAILED DESCRIPTION

Figure 1:
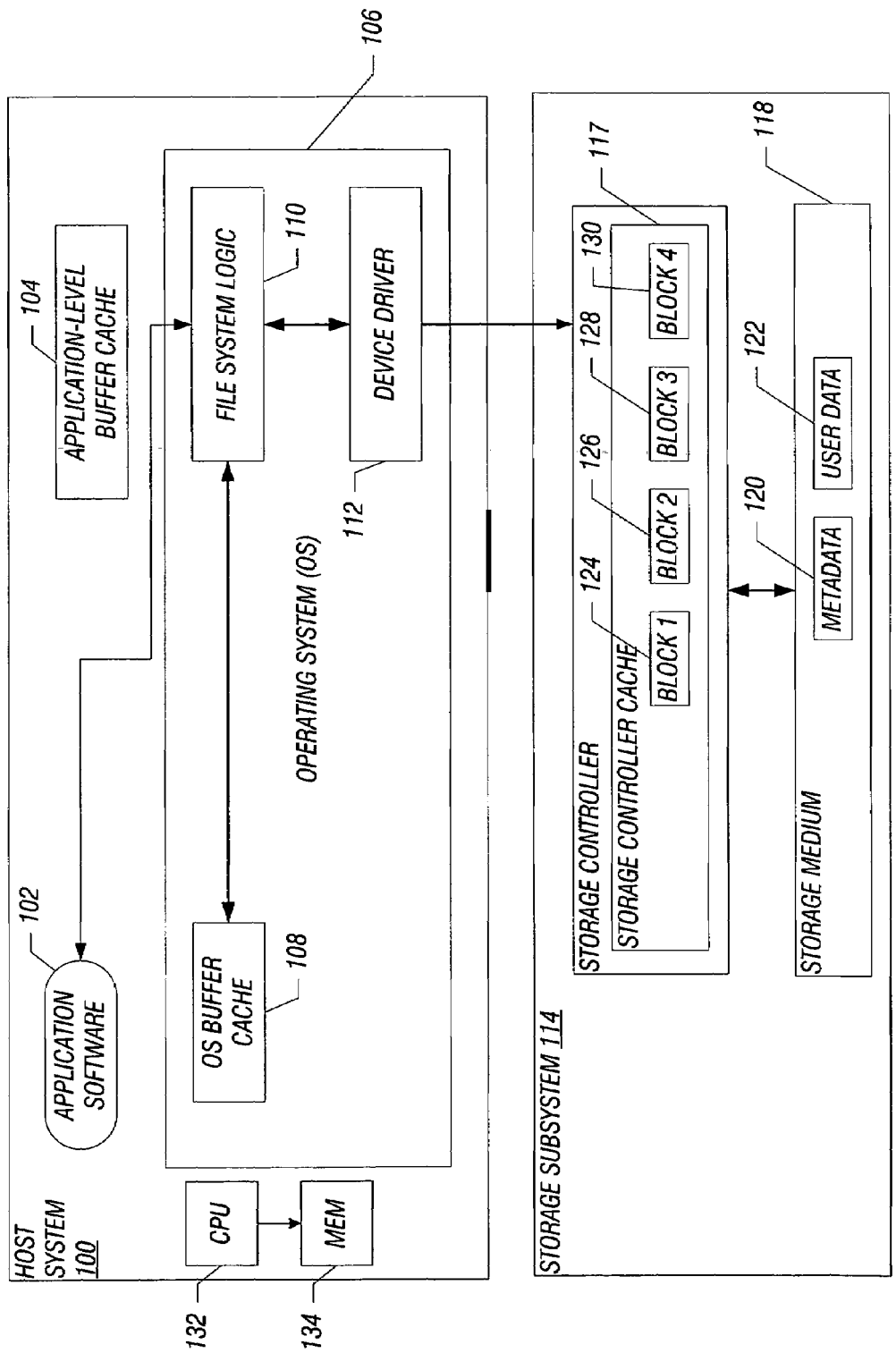
FIG. 1 is a block diagram of an example system that includes file system logic according to an embodiment.

As depicted in FIG. 1, a host system 100 is coupled to a storage subsystem 114, where the storage subsystem 114 includes a storage medium 118 for storing data. Note that although the storage subsystem 114 is shown as separate from the host system 100, the storage subsystem 114 can be part of the host system 100. Also, the label "host" is used for exemplary purposes, as mechanisms according to some embodiments can be used in other types of computer systems in other implementations. The storage subsystem 114 can be implemented with various types of storage devices, including disk-based storage devices, integrated circuit storage devices, and other types of storage devices. Examples of the storage medium 118 include disk-based storage medium (e.g., magnetic or optical disk or disks), integrated circuit-based storage medium, nanotechnology or microscopy-based storage medium, or other types of storage media. The term "storage medium" refers to either a single storage medium or multiple storage media (e.g., multiple disks, multiple chips, etc.).

A storage controller 116 in the storage subsystem 114 controls access of data contained on the storage medium 118. Examples of the data contained on the storage medium 118 include user data 122 and file system metadata 120. The term "user data" broadly refers to data that is associated with either a user, application, or other software in a computer system. Examples of user data include, but are not limited to, user files, software code, and data maintained by applications or other software.

File system metadata generally refers to data that describes the user data (e.g., structure, content, and attributes of the user data). Examples of file system metadata include, but are not limited to, file names, information relating to ownership and access rights, last modified date, file size, and so forth.

The storage controller 116 includes a storage controller cache 117 for temporarily storing data (e.g., a portion of the user data 122 and/or file system metadata 120) retrieved from the storage medium 118. As depicted in FIG. 1, the data retrieved from the storage medium 118 is stored as blocks 124 (block 1), 126 (block 2), 128 (block 3), and 130 (block 4). The storage controller cache 117 can store more blocks. A "block" of data refers to some predefined collection or portion of data. Although depicted as being inside the storage controller 116, the storage controller cache 117 can alternatively be located outside of the storage controller 116. More generally, the storage controller cache 117 is coupled to or associated with the storage controller 116.

The host system 100 includes an operating system (OS) 106. The operating system 106 includes file system logic 110 and a device driver 112. The operating system 106 is associated with an operating system buffer cache 108 that is used to buffer certain data, as described further below. In response to requests from application software 102 (or other software), the file system logic 110 issues access requests (read requests and/or write requests) to the storage subsystem 114 through the device driver 112. Although only one application software 102 is depicted in FIG. 1, it is noted that the host system 100 can include multiple application software 102.

In addition, an application-level buffer cache 104 can be maintained for each application software 102. The application-level buffer cache 104 is maintained by the application software to buffer data requested by the application software 102. The application-level buffer cache 104 and operating system buffer cache 108 can be stored in a memory 134 of the host system 100. The memory 134 can be implemented with non-persistent storage devices such as dynamic random access memories (DRAMs), synchronous DRAMs (SDRAMs), and so forth. Alternatively, the memory 134 can be implemented with persistent storage devices. The memory 134 is more closely coupled to a central processing unit (CPU) 132 (or plural CPUs) such that the CPU(s) 132 can more quickly access the content of the memory 134 than the content of the storage subsystem 114. The software in the host system 100, including the application software 102, operating system 106, file system logic 110, and device driver 112, are executable on the CPU 132.

The file system logic 110 is part of a file system. The file system also includes the file system metadata 120 stored on the storage medium 118. A "file system" refers to the mechanism used for storing and organizing user data on the storage medium 118. The file system logic 110 performs access control and other management and storage tasks (e.g., create, move, and delete files; modify files; deny or allow access to files).

There are two types of requests that can be issued by application software (or other software) in the host system 100: cached I/O requests or direct I/O requests. In the ensuing discussion, reference is made to "direct I/O software" and "cached I/O software." "Direct I/O software" refers to software that issues direct I/O requests, and "cached I/O software" refers to software that issues cached I/O requests. Normally, an application software (or other software) is configured to perform either cached I/O requests or direct I/O requests. Thus, in one scenario, a first application software performs cached I/O requests, while a second application software performs direct I/O requests. However, in other scenarios, a single application software (or other software) is able to perform both cached I/O requests and direct I/O requests, depending upon the context of each particular request.

A "cached I/O request" is a request for access of data stored on the storage medium 118 in which a speculative read-ahead or prefetch operation is performed by the file system logic 110 for the purpose of reading other data (referred to as "read-ahead data"), in addition to the data requested by the cached I/O request. To perform a read-ahead operation, the file system logic 110 issues one or more read-ahead requests to the storage subsystem 114. The read-ahead data retrieved in response to the read-ahead requests is stored in the operating system buffer cache 108. Any subsequent requests for data issued by software can be satisfied from the operating system buffer cache 108 if the data was previously retrieved based on a read-ahead operation and stored in the operating system buffer cache 108. Speculative read-ahead operations performed for cached I/O requests are performed for the purpose of pre-populating the operating system buffer cache 108 so that performance of subsequent requests can be enhanced if the data can be retrieved from the operating system buffer cache 108 instead of from the slower storage subsystem 114.

A "direct I/O request" differs from the cached I/O request in that the direct I/O request does not cause the file system logic 110 to perform a read-ahead operation for the purpose of pre-populating the operating system buffer cache 108. A "direct I/O request" is thus a request that is issued by software where the operating system buffer cache 108 is bypassed such that the operating system buffer cache 108 is not pre-populated with read-ahead data. However, in accordance with some embodiments of the invention, to enhance performance of software that issues direct I/O requests, read-ahead requests are issued by the file system logic 110 for the purpose of pre-populating the storage controller cache 117. The read-ahead requests are submitted to request data not specified in the original direct I/O request.

Note that the difference between cached I/O read-ahead operations and direct I/O read-ahead operations, according to some embodiments, is that the cached I/O read-ahead operations pre-populate the operating system buffer cache 108, whereas the direct I/O read-ahead operations pre-populate the storage controller cache 117 but not the operating system buffer cache 108. Subsequent requests from a direct I/O software that can be satisfied from the-storage controller cache 117 (instead of from the storage medium 118) results in enhanced data throughput since data can be retrieved from the storage controller cache 117 more quickly than from the storage medium 118. The storage controller cache 117 can be implemented with faster storage device(s) than the storage medium 118.

Figure 2:
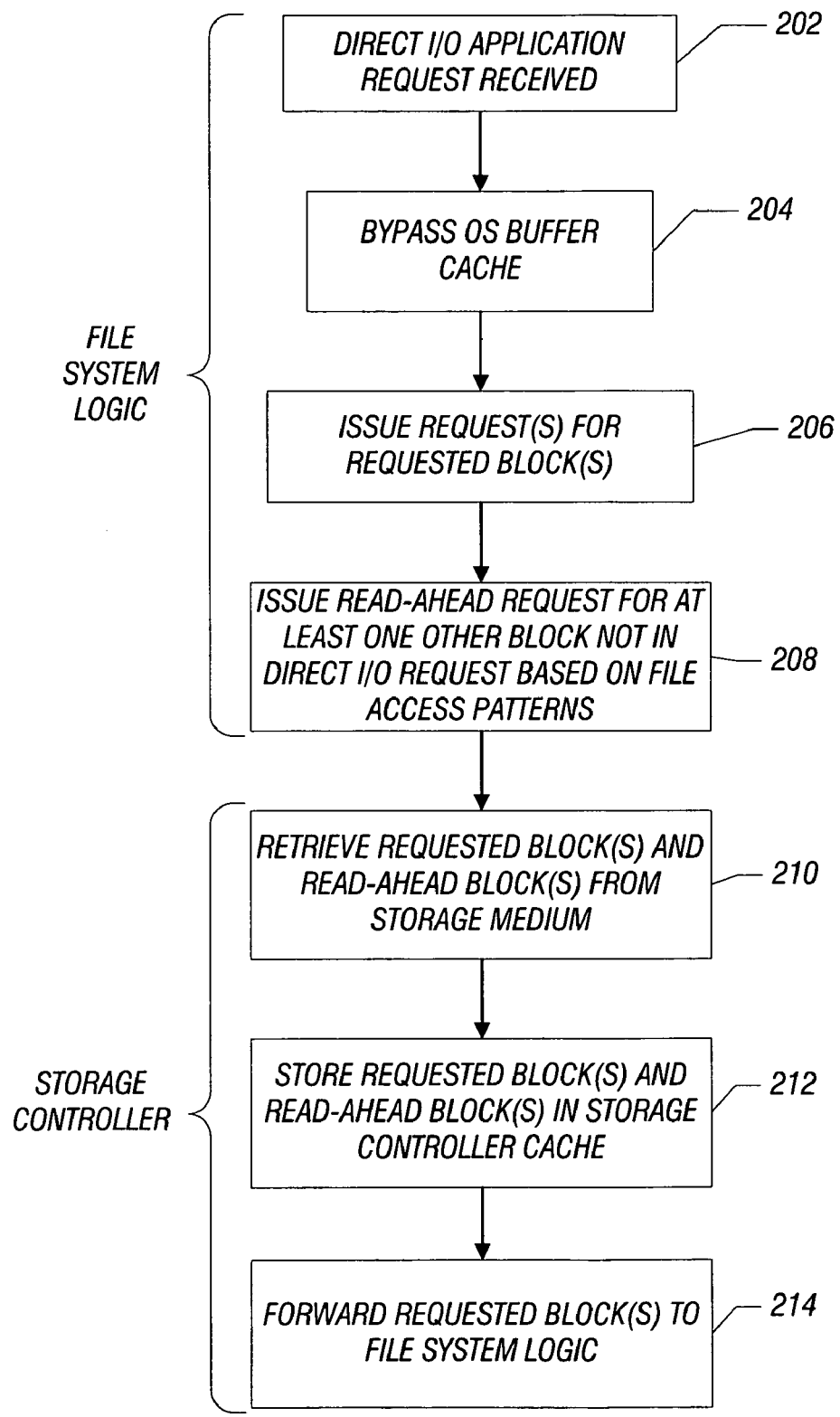
FIG. 2 is a flow diagram of a process of performing a direct input/output (I/O) request, according to an embodiment.

FIG. 2 shows a process of performing direct I/O requests according to an embodiment. Reference is made to both FIG. 1 and FIG. 2 in the following discussion. Upon receipt of a direct I/O request (at 202) from the application software 102, the file system logic 110 processes the request by bypassing (at 204) the operating system buffer cache 108. Bypassing the operating system buffer cache 108 means that the file system logic 110 does not perform read-ahead operations for the purpose of pre-populating the operating system buffer cache 108.

The file system logic 110 issues (at 206) request(s) for requested block(s) of data on the storage medium 118. The requested block(s) refer(s) to the data requested by the direct I/O request received at 202.

In addition to issuing request(s) for the requested block(s) of data, the file system logic 110 also issues (at 208) a read-ahead request (or plural read-ahead requests) for at least one other block not in the received direct I/O request. The read-ahead request(s) is (are) generated based on file access patterns by direct I/O software.

The file system logic 110 is able to monitor the file access patterns of a direct I/O software. A "file access pattern" or "access pattern" refers to prior or historical access behavior of the direct I/O software, such as repetitive access behavior (where the software tends to repeat accesses of certain blocks of data), sequential access behavior (where the software tends to access consecutive blocks of data from a current block), or other regular access behavior that can be used to predict what the software is likely to do after accessing a current block.

Based on these monitored patterns, the file system logic 110 is able to generate predictions for what data may be requested next. The read-ahead request(s) issued at 208 is (are) based on such predictions. As an example, a direct I/O software includes software that sequentially accesses large blocks of data. By monitoring this sequential behavior, the file system logic 110 is able to predict, based on an access request of a particular block of data, the direct I/O software will likely request consecutive blocks of data in future requests. Based on such a prediction in the example scenario, the read-ahead request(s) issued by the file system logic 110 will retrieve data in consecutive blocks of data following the block(s) requested in the direct I/O request.

Prediction information developed by the file system logic 110 based on monitoring patterns of direct I/O software can be stored in the memory 134 or in the storage subsystem 114. This prediction information is accessed to determine read-ahead requests that should be generated in response to a particular access request from the direct I/O software.

The prediction information provides information regarding prior or historical access behaviors of the direct I/O software that can be used to derive a likely subsequent behavior of the direct I/O software. As examples, the prediction information indicates whether the direct I/O software is likely to repeat access of certain blocks of data, perform sequential access of blocks of data, jump between blocks of data at different locations, and so forth. Based on examination of the prediction information and the current direct I/O request, the file system logic 110 develops appropriate read-ahead request(s) for data that will likely be subsequently accessed by the direct I/O software.

In response to the requests issued by the file system logic 110 at 206 and 208, the storage controller 116 retrieves (at 210) the requested block(s) and the read-ahead block(s) from the storage medium 118. The requested block(s) and read-ahead block(s) are then stored in the storage controller cache 117. The requested block(s) is (are) further forwarded (at 214) to the file system logic 110, which in turns forwards the requested data to the requesting application software. Note that the read-ahead block(s) performed in response to the read-ahead request(s) remain in the storage controller cache 117, and is (are) not forwarded to be stored in the operating system buffer cache 108. Any subsequent request issued by application software can be satisfied from the storage controller cache 117 (if the requested data is stored in the storage controller cache 117) for faster access.

By using techniques according to some embodiments of the invention, the combination of the benefits associated with direct I/O and read-ahead can be provided. Use of direct I/O requests by certain application software is possible to avoid the costs associated with populating the operating system buffer cache 108. At the same time, read-ahead can be performed to pre-populate a storage controller cache 117 so that the benefit of using read-ahead data to satisfy subsequent requests may be achieved.

The flow diagram of FIG. 2 is exemplary, where the acts/blocks of the figure can be added, removed, altered, and so forth, and still be covered by embodiments of the invention.

Instructions of software routines (including the operating system 106, file system logic 110, device driver 112, and application software 102 in FIG. 1) are loaded for execution on a processor (e.g., CPU 132). The processor includes microprocessors, microcontrollers, processor modules or subsystems (including one or more microprocessors or microcontrollers), or other control or computing devices.

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
a storage subsystem comprising a storage controller, and a cache associated with the storage controller, and
a host system comprising file system logic to receive a direct input/output (I/O) request for a first data portion stored in the storage subsystem,
the file system logic to perform a read-ahead operation in response to the direct I/O request to request at least one other data portion stored in the storage subsystem, the cache associated with the storage controller to store the at least one other data portion requested by the read-ahead operation, wherein the host system further comprises an operating system and an OS-buffer cache associated with the operating system, the file system logic to bypass the OS-buffer cache associated with the operating system in processing the direct I/O request.

2. The system of claim 1, wherein the at least one other data portion is not specified in the direct I/O request.

3. The system of claim 2, the storage controller to return the first data portion to the file system logic in response to the direct I/O request, but the storage controller to not return the at least one other data portion to the file system logic in response to the direct I/O request.

4. The system of claim 1, further comprising software to submit a cached I/O request to the file system logic,
the file system logic to, in response to the cached I/O request, perform a read-ahead operation to request one or more data portions for storing in the cache associated with the operating system.

5. The system of claim 1, wherein the file system logic is part of the operating system, and the file system logic bypasses the cache associated with the operating system by not storing the at least one other data portion in the cache associated with the operating system.

6. The system of claim 1, further comprising a first application software to issue the direct I/O request to the file system logic.

7. The system of claim 6, wherein the host system further comprises:
a second application software to issue a cached I/O request to the file system logic,
the file system logic to, in response to the cached I/O request, issue a read-ahead request to retrieve a further data portion from the storage subsystem for storage in the cache associated with the operating system.

8. A method comprising:
receiving, by file system logic in a host system, a direct input/output (I/O) request for a first data portion stored in a storage subsystem;
in response to the direct I/O request, the file system logic to submit a first request for the first data portion and a read-ahead request to retrieve a second data portion stored in the storage subsystem;
retrieving, by a storage controller in the storage subsystem, the first data portion in response to the first request and the second data portion in response to the read-ahead request;
storing, by the storage controller, the second data portion in a cache in the storage subsystem and associated with the storage controller, and
the file system logic bypassing an OS-buffer cache associated with an operating system in the host system in response to the direct I/O request.

9. The method of claim 8, further comprising forwarding, by the storage controller, the first data portion to the file system logic in response to the direct I/O request, but not forwarding the second data portion to the file system logic in response to the direct I/O request.

10. The method of claim 9, further comprising:
receiving a subsequent direct I/O request by the file system logic; and
retrieving the second data portion from the cache associated with the storage controller in response to the second direct I/O request.

11. The method of claim 8, further comprising:
receiving a cached I/O request by the file system logic;
sending, by the file system logic, a second read-ahead request to request a third data portion stored in the storage subsystem in response to the cached I/O request; and storing, by the file system logic in response to the second read-ahead request, the third data portion in the cache associated with the operating system.

12. The method of claim 11, wherein bypassing, by the file system logic, the cache associated with the operating system in response to the direct I/O request is performed by not scoring the second data portion in the cache associated with the operating system.

13. The method of claim 11, wherein storing the third data portion in the cache associated with the operating system comprises storing the third data portion in the cache associated with the operating system that is separate from the cache associated with the storage controller.

14. The method of claim 8, wherein the direct I/O request is issued by a software, the method further comprising monitoring an access pattern of the software, the read-ahead request being based on the monitored access pattern.

15. An article comprising at least one storage medium containing instructions that when executed cause a file system of a host computer to:

receive a direct input/output (I/O) request for a first data portion stored in a storage subsystem;

in response to the direct I/O request, submit a request for the first data portion and a read-ahead request to retrieve a second data portion stored in the storage subsystem, the read-ahead request to cause the second data portion to be stored in a cache associated with a storage controller, the storage controller being in the storage subsystem;

receive the first data portion from the storage controller in response to the request for the first data portion; and receive the second data portion from the cache of the storage controller in response to a subsequent request for the second data portion;

wherein the host computer includes an operating system and an OS-buffer cache associated with the operating system, wherein the instructions when executed cause the file system to bypass the OS-buffer cache associated with the operating system in processing the direct I/O request.

16. The article of claim 15, wherein the direct I/O request is issued by a software, the instructions when executed causing the file system to further:

monitor an access pattern of the software; and generate the read-ahead request based on the monitored access pattern.

17. The article of claim 15, wherein bypassing the cache associated with the operating system is performed by not storing the second data portion in the cache associated with the operating system.

18. The article of claim 15, wherein the instructions when executed cause the file system to further:

receive a cached I/O request;

generate a second read-ahead request in response to the cached I/O request; and store data received in response to the second read-ahead request in the cache associated with the operating system.

19. A system comprising:

a storage subsystem including a storage controller, the storage controller having a first cache;

a cached input/output (I/O) software;

a direct I/O software;

an operating system;

a second cache associated with the operating system; and file system logic in the operating system to:

receive a cached I/O request from the cached I/O software;

issue a first read-ahead request to the storage subsystem in response to the cached I/O request;

store data received in response to the first read-ahead request in the second cache associated with the operating system;

receive a direct I/O request from the direct I/O software;

issue a second read-ahead operation in response to the direct I/O request; and store data received in response to the second read-ahead operation in the first cache in the storage controller; and bypass the second cache associated with the operating system in processing the direct I/O request.

* * * * *

UNITED STATES PATENT AND TRADEMARK OFFICE
CERTIFICATE OF CORRECTION

PATENT NO. : 7,383,392 B2  Page 1 of 1
APPLICATION NO. : 11/141340
DATED : June 3, 2008
INVENTOR(S) : Timothy W. Mark et al.

It is certified that error appears in the above-identified patent and that said Letters Patent is hereby corrected as shown below:

In column 5, line 55, in Claim 1, after "controller" delete ",".

In column 5, line 56, in Claim 1, after "controller" delete "," and insert -- ; --, therefor.

In column 6, line 47, in Claim 8, after "controller" delete "," and insert -- ; --, therefor.

In column 7, line 7, in Claim 12, delete "scoring" and insert -- storing --, therefor.

In column 7, line 34, in Claim 15, after "portion" delete ";" and insert -- , --, therefor.

Signed and Sealed this

Fourth Day of November, 2008

JON W. DUDAS
*Director of the United States Patent and Trademark Office*